June 12, 1928.
W. H. HIMES
1,673,566
POWER MECHANISM
Filed Oct. 1, 1923
Fig. 1.
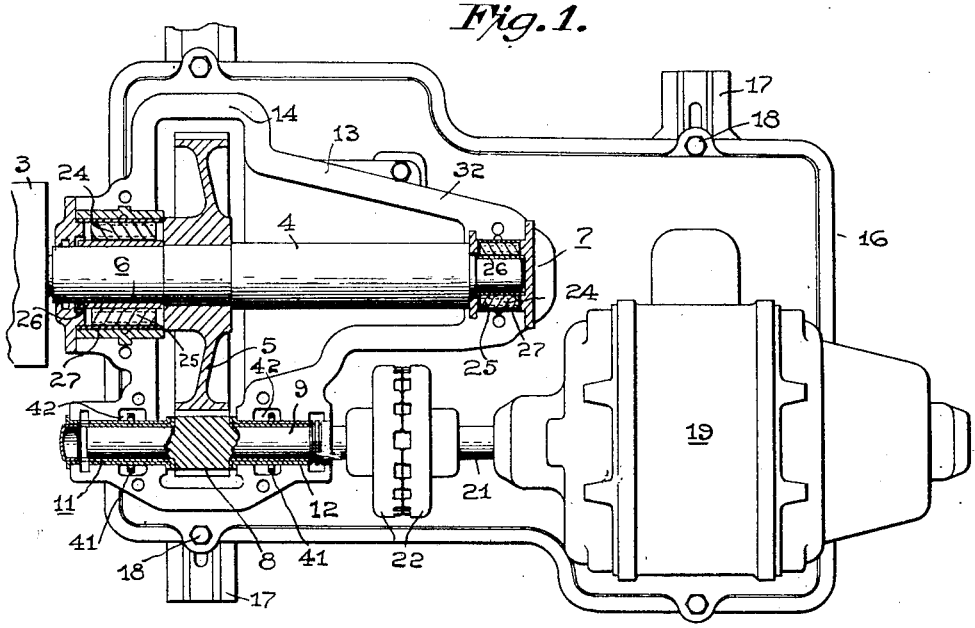
Fig. 2.
Fig. 3.
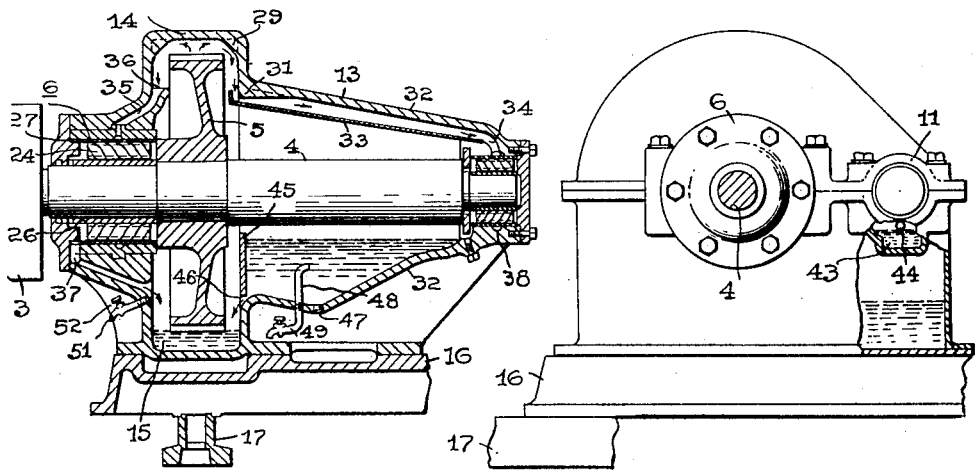
WITNESSES:
R. S. Harrison
O. B. Buchanan
INVENTOR
Walter H. Himes
BY
Wesley G. Carr
ATTORNEY Patented June 12, 1928.

1,673,566

UNITED STATES PATENT OFFICE.

WALTER H. HIMES, OF PITTSBURGH, PENNSYLVANIA, ASSIGNOR TO WESTINGHOUSE ELECTRIC & MANUFACTURING COMPANY, A CORPORATION OF PENNSYLVANIA.

POWER MECHANISM.

Application filed October 1, 1923. Serial No. 665,831.

My invention relates to power mechanisms and lubricating systems therefor.

One object of my invention is to provide a power mechanism comprising an electric motor mounted on the same bedplate as a single-reduction gear unit carrying an overhung pulley adapted for severe duty under favorable operating conditions.

Another object of my invention is to provide means for supplying a lubricating oil to a plurality of bearings and for returning said oil to the source of supply in a continuous manner.

Another object of my invention is to provide a splash-lubrication system wherein an auxiliary reservoir is provided, for collecting the oil splashed by the splashing means and for storing it at a higher level than the oil in the main casing, the oil being returned from the auxiliary reservoir to the main supply through a restricted orifice at a predetermined slow rate.

With the above and other objects in view, which will become apparent as the description proceeds, my invention consists in the combinations and systems set forth in the following description and claims, and illustrated in the accompanying drawing, wherein Figure 1 is a plan view of the device, partially in section and partially in elevation, and having the upper section of the gear casing removed;

Fig. 2 is a side view, partially in elevation and partially in section, showing the gear casing and its parts; and Fig. 3 is a view in end elevation thereof, partly in section.

According to my invention, an overhung pulley 3 is mounted on the end of a shaft 4 of a gear wheel 5, said shaft being supported in bearings indicated generally at 6 and 7. Meshing with the gear wheel 5 is a pinion 8 mounted on a pinion shaft 9, which is supported in bearings indicated generally at 11 and 12. The parts just described, with the exception of the pulley 3, are substantially enclosed in a gear casing 13 which is provided with an enlarged portion 14 surrounding the gear wheel and providing a reservoir for a body of lubricating oil indicated at 15 (Fig. 2).

The gear unit just described is mounted on a bedplate 16 which is preferably adjustably mounted on rails 17 by bolts 18, and an electric motor 19 is mounted on the same bedplate, with its shaft 21 in alinement with the pinion shaft 9 and operatively associated therewith by means of a coupling 22 or any other suitable means.

My invention will best be understood by a consideration of the duty required thereof. At the present time, the practice in certain oil fields is to drill the well by means of a steam engine operating a walking beam under a derrick, and after the well is drilled, to remove the derrick and the steam engine to other fields and to set up permanently an electric motor for continuous pumping. The use of an electric motor involves an extra speed-reduction, by reason of the fact that the steam engine will operate satisfactorily at 200 to 500 R. P. M., whereas the electric motor will not work effectively below 600 R. P. M.

Heretofore, very great trouble has been experienced in the speed-reduction gear by reason of the peculiar operating conditions. It has been customary to belt the crank shaft, which operates the walking beam, to a countershaft having a large pulley and a small pulley, and to belt the motor to the larger of said pulleys. Furthermore, by reason of the excessive strains on the belts, it is necessary for the belt pulleys to be overhung, in order to facilitate the shortening of the belts from time to time. The tension of the belts, which are often very tight and pulling in opposite directions, at the two ends of the countershaft, produces a very severe turning moment on the two bearings of the countershaft. Since the countershaft bearings, in times past, have been located close together in order to provide the overhung construction, the severe turning moment and the tension of the belts have resulted in such tight squeezing of the bearings as to cause considerable trouble in the countershaft, inducing certain operating companies to authorize the expenditure of large amounts for gearing devices to replace the countershaft.

In order to meet the problem which has just been described, I have devised the gear unit which constitutes the subject matter of the present application. My gear unit provides a fixed distance between the main countershaft or pulley shaft and the pinion shaft, as the bore for these two shafts is provided at the factory. I have provided the overhung pulley which the trade demands, but I have built a special frame or casing 14 having an extra long main shaft or countershaft 4, providing a considerable distance between the two bearings 6 and 7. In the form shown in the drawing, the pulley 3, bearing 6 and gear wheel 5 are disposed close together, while the bearing 7 is disposed at a considerable distance from the gear wheel 5 in order to provide a better leverage for these two bearings than has been provided in devices utilized heretofore.

Owing to the fact that common sleeve bearings have the inherent defect that when they are underload, the oil is pressed out of the bearings and they are thus quite likely to score when starting, I have selected, for the bearings of my main shaft 4, an anti-friction bearing utilizing hollow rollers 24 having spiral grooves 25 therein, said rollers being suitably mounted in inner and outer races 26 and 27.

The particular advantages of the special bearings which I have selected for the main shaft 4, are three-fold. First, the frictional loss, when starting from rest, is no greater than when running, so that the operators need fear no trouble in the gear unit, from any amount of shutdowns. This advantage is inherent, in general, in all anti-friction bearings. Second, by reason of the hollow construction of the rollers, they have the property of absorbing oil into the core of the roller when an excess of oil is present, thus providing a supply of lubricant in case of a failure of the oil supply system, in which case the oil is fed slowly from within the roller and the bearing is thus protected from neglect for a long time. Third, the spiral construction of the roller gives a wiping motion in the race, so that in case grit should get in the bearing the tendency of the roller is to clear itself, where other bearings tend to crush the foreign matter and abrade themselves.

The normal oil supply for the bearings is provided by a splash-lubrication system wherein gear wheel 5 operates in the body of oil contained in the bottom of the enlarged portion 14 of the gear casing, the oil being splashed and elevated by centrifugal action to lubricate not only the contacting surfaces of the gears but all the bearings as well. The gear casing is provided, at the top of its enlarged portion 14, with filleted corners 29 and a filleted edge or drip portion 31 at the beginning of a conically-shaped extension 32 of the casing, which supports the end of the shaft 4 in the bearing 7. A suitable trough 33 is provided for conducting the oil from the filleted corner 31 to a channel 34 supplying the bearing 7. In a similar way, oil is supplied to the bearing 6 through a channel 35 having an upwardly disposed mouth 36 for catching the oil splashed by the gear wheel 5. The oil is discharged from the bearings 5 and 6 through suitable channels 38 and is thus returned to the main reservoir provided in the bottom of the gear case.

The pinion or high-speed bearings 11 and 12 of my unit are of the common sleeve type and are interchangeable with the main bearings of the motor, thus simplifying the servicing of the high-speed bearings. The pinion bearings are both provided with auxiliary oiling rings 41 cooperating with oil wells 42, shown more particularly in Fig. 3, said oil wells being provided with overflow openings 44. Thus, when there is an abundance of oil in the gear casing, the gears throw the oil into the various passages, keeping not only the roller bearings but the ring oil bearings supplied.

In the event of neglect on the part of the operator allowing the oil level to become so low that the gears no longer throw the oil, the auxiliary oiling reservoirs will protect the pinion bearings for a long time and the oil-storing, hollow roller bearings will also run satisfactorily for a considerable period, as described hereinabove. It is expected that, in such an event, the excessive noise of the gearing from running dry will call the attention of the operator to the condition of the case before damage to the bearings can result.

It has also been found that an excessive quantity of oil in the main reservoir casing, causing the gear wheel to churn the same, is a disadvantage resulting in the heating of the oil and thence of the bearings, and resulting also in noticeable losses of efficiency. The ideal condition appears to exist when the gear teeth just strike the surface of the oil. I provide, therefore, a baffle plate or dam 45 adjacent the gear wheel 5 on the side toward the conical extension 32 of the casing. The oil that is thrown around the case finds its way into the space provided between the baffle plate 45 and the bottom walls of the conical casing extension 32 to provide an auxiliary reservoir having an artificial oil level. There is a carefully graduated opening 46 at the bottom of the baffle plate 45, which permits a suitable amount of oil to trickle back into the main reservoir.

By means of the arrangement just described, when the apparatus is allowed to remain at rest for any length of time, the entire supply of oil back of the baffle plate will slowly creep into the main reservoir. Immediately upon starting the gears, however, the excess of oil is quickly churned out of the main reservoir and is caught in the auxiliary reservoir. Thereafter, as long as the gear continues to run, the only oil in circulation is that which is allowed to flow through the orifice 46 and this quantity will be caught up by the main gear and thrown about the case, distributing itself to the various bearings.

There are several results which follow from the type of circulation just described. First, the highest efficiency is obtained and there is no churning of the oil except during the few minutes after starting. Second, the auxiliary reservoir constitutes a settling basin where the oil is allowed to come to rest and deposit any sediment which may wear off from the gears or bearings. The bottom of the auxiliary reservoir is depressed and provided with a suitable petcock 47. Third, the utilization of the auxiliary reservoir permits the storage of a much greater quantity of oil at one filling than would be possible where the excess must be churned continuously with one reservoir only.

Suitable means are preferably provided for indicating, in a positive manner, the existence of a sufficient quantity of oil in the casing. I have found that ordinary oil indicators are unreliable owing to their tendency to stick or otherwise erroneously indicate, particularly on account of the heavy quality of the oil which is used. I have provided, therefore, a suitable indicating system comprising a pipe 48 having its open upper end disposed within the auxiliary reservoir, and having a stopcock 49 on its lower end. By turning the stopcock 49, the operator can ascertain, from time to time during the operation of the apparatus, whether there is sufficient oil in the auxiliary reservoir to flow out through the pipe 48. When the oil level in the auxiliary reservoir falls so low that oil will no longer flow out through said pipe, the operator will know that it is necessary to supply more lubricant.

An overflow pipe 51 having a stopcock 52 may also be provided for the main reservoir in the bottom of the enlarged portion 14 of the casing, whereby the proper level of the oil during standstill conditions may be determined.

While I have described, in considerable detail, the preferred form of my invention, it will be understood that my invention is susceptible of such modifications and changes as fall within the scope of the appended claims when read in the light of the prior art.

I claim as my invention:

1. Power mechanism comprising a gear wheel, a shaft therefor, anti-friction bearings for said shaft, a pinion meshing with said gear wheel, a pinion shaft, sleeve bearings for said pinion shaft, a gear casing enclosing substantially all of said parts and constituting a reservoir for lubricant, means for utilizing splash lubrication for said gears and bearings, auxiliary reservoirs for lubricant associated with said pinion bearings and overflowing into said casing, means for supplying lubricant from said auxiliary reservoirs to said pinion bearings, an overhung pulley mounted on said gear shaft, the anti-friction bearing which is the further removed from said pulley being spaced the greater distance from said gear wheel, and a mechanically connected device mounted adjacent to said last-mentioned bearing and having a shaft in alinement with said pinion shaft and operatively associated therewith.

2. Power mechanism comprising a gear wheel, a horizontal shaft therefor, anti-friction bearings for said shaft, a pinion meshing with said gear wheel, a pinion shaft, bearings for said pinion shaft, a gear casing enclosing substantially all of said parts and constituting a reservoir for lubricant, means for utilizing splash lubrication within said casing, one of said gear-wheel bearings being spaced a greater distance from the gear wheel than the other, a partition in said casing for dividing off a space constituting an auxiliary reservoir adjacent said spaced bearing for collecting lubricant splashed from said main reservoir and holding said lubricant at a higher level than the body of lubricant in said main reservoir and means for feeding lubricant from said auxiliary reservoir to said main reservoir at a predetermined restricted rate for controlling the amount of lubricant splashed in the main casing in the normal operation of the device.

3. Power mechanism comprising a gear wheel, a shaft therefor, anti-friction bearings for said shaft, a pinion meshing with said gear wheel, a pinion shaft, bearings for said pinion shaft, a gear casing enclosing substantially all of said parts and constituting a reservoir for lubricant, means for utilizing splash lubrication within said casing, one of said gear-wheel bearings being spaced a greater distance from the gear wheel than the other, a partition in said casing for dividing off a space constituting an auxiliary reservoir adjacent said spaced bearing for collecting lubricant splashed from said main reservoir and holding said lubricant at a higher level than the body of lubricant in said main reservoir, means for feeding lubricant from said auxiliary reservoir to said main reservoir at a predetermined restricted rate for controlling the amount of lubricant splashed in the main casing in the normal operation of the device, an overhung pulley mounted on said gear shaft, and a power translating device operatively associated with said pinion shaft.

4. Power mechanism comprising a gear wheel, a shaft therefor, anti-friction bearings for said shaft, a pinion meshing with said gear wheel, a relatively short pinion shaft, a gear casing enclosing substantially all of said parts and constituting a reservoir for lubricant, means for utilizing splash lubrication for said gears and bearings, an overhung pulley mounted on said gear shaft, the anti-friction bearing which is the further removed from said pulley being spaced the greater distance from said gear wheel, and a mechanically connected device mounted adjacent to said last-mentioned bearing and having a shaft in alinement with said pinion shaft and operatively associated therewith.

In testimony whereof, I have hereunto subscribed my name this 28th day of September, 1923.

WALTER H. HIMES.